United States Patent
Masuda et al.

(10) Patent No.: US 10,134,283 B2
(45) Date of Patent: Nov. 20, 2018

(54) ROAD SURFACE IMAGE-DRAWING SYSTEM FOR VEHICLE

(71) Applicant: KOITO MANUFACTURING CO., LTD., Minato-ku, Tokyo (JP)

(72) Inventors: Takeshi Masuda, Shizuoka (JP); Michihiko Hayakawa, Shizuoka (JP); Yuichi Shibata, Shizuoka (JP); Takayuki Yagi, Shizuoka (JP); Misako Nakazawa, Shizuoka (JP); Toshiaki Tsuda, Shizuoka (JP); Hidetada Tanaka, Shizuoka (JP); Satoshi Yamamura, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/509,259

(22) PCT Filed: Sep. 7, 2015

(86) PCT No.: PCT/JP2015/075320
§ 371 (c)(1),
(2) Date: Jul. 17, 2017

(87) PCT Pub. No.: WO2016/039288
PCT Pub. Date: Mar. 17, 2016

(65) Prior Publication Data
US 2017/0337821 A1 Nov. 23, 2017

(30) Foreign Application Priority Data
Sep. 8, 2014 (JP) ................. 2014-181881

(51) Int. Cl.
*B60Q 1/00* (2006.01)
*G08G 1/16* (2006.01)
(Continued)

(52) U.S. Cl.
CPC ............... *G08G 1/166* (2013.01); *B60Q 1/00* (2013.01); *B60Q 1/04* (2013.01); *B60Q 1/26* (2013.01);
(Continued)

(58) Field of Classification Search
CPC .......... G08G 1/16; G08G 1/161; G08G 1/166; G08G 1/0962; G01S 17/936;
(Continued)

(56) References Cited

U.S. PATENT DOCUMENTS

2005/0073437 A1* 4/2005 Perri ...................... G08G 1/005
340/944
2007/0280503 A1 12/2007 Kubota et al.
(Continued)

FOREIGN PATENT DOCUMENTS

| CN | 101082503 A | 12/2007 |
| EP | 2 233 356 A1 | 9/2010 |

(Continued)

OTHER PUBLICATIONS

International Search Report dated Dec. 1, 2015, by the International Searching Authority in counterpart International Application No. PCT/JP2015/075320 (PCT/ISA/210).

(Continued)

*Primary Examiner* — Thomas Mullen
(74) *Attorney, Agent, or Firm* — Sughrue Mion, PLLC

(57) ABSTRACT

In this invention, letters that can be seen by a pedestrian (101) are drawn on an intersection (103). A mark (MM2) that can be seen by the driver of the host vehicle (C) is drawn on the road (104) between the intersection (103) and the host-vehicle (C). The shapes of the letters (MO4) are corrected in accordance with the positional relationship between the pedestrian (101) and the intersection (103). The shape of the mark (MM2) is corrected in accordance with the positional relationship between the driver of the host-vehicle (C) and the road (104).

13 Claims, 10 Drawing Sheets

(51) Int. Cl.
  *B60Q 1/04* (2006.01)
  *B60Q 1/26* (2006.01)
  *B60Q 1/50* (2006.01)
  *B60R 21/00* (2006.01)
  *G08G 1/0962* (2006.01)

(52) U.S. Cl.
  CPC ............. *B60Q 1/50* (2013.01); *B60R 21/00* (2013.01); *G08G 1/0962* (2013.01); *G08G 1/16* (2013.01)

(58) Field of Classification Search
  CPC . B60R 2400/50; B60R 21/00; B60Q 2400/50; B60Q 1/00; B60Q 1/04; B60Q 1/26; B60Q 1/50
  USPC .......... 340/435, 463–471, 944; 701/300, 301
  See application file for complete search history.

(56) References Cited

U.S. PATENT DOCUMENTS

| | | | | |
|---|---|---|---|---|
| 2013/0249684 | A1* | 9/2013 | Hatakeyama | B60K 35/00 340/435 |
| 2014/0062685 | A1* | 3/2014 | Tamatsu | B60Q 5/005 340/425.5 |
| 2014/0236483 | A1 | 8/2014 | Beaurepaire et al. | |
| 2015/0163470 | A1 | 6/2015 | Katsumi | |
| 2016/0207443 | A1* | 7/2016 | Widdowson | B60Q 1/0011 |
| 2017/0169703 | A1* | 6/2017 | Carrasco | G08G 1/005 |

FOREIGN PATENT DOCUMENTS

| | | |
|---|---|---|
| JP | 2004306894 A | 11/2004 |
| JP | 2008-287669 A | 11/2008 |
| JP | 2009184428 A | 8/2009 |
| JP | 2013237427 A | 11/2013 |
| JP | 2014013524 A | 1/2014 |

OTHER PUBLICATIONS

Written Opinion dated Dec. 1, 2015, issued by the International Searching Authority in counterpart International Application No. PCT/JP2015/075320 (PCT/ISA/237).

Communication dated Apr. 20, 2018, issued by the European Patent Office in counterpart European application No. 15840334.5.

Communication dated Jun. 5, 2018, from the Japanese Patent Office in counterpart application No. 2014- 181881.

Communication dated Jul. 16, 2018, issued by the State Intellectual Property Office of P.R. China in counterpart Chinese Application No. 201580047716.X.

\* cited by examiner

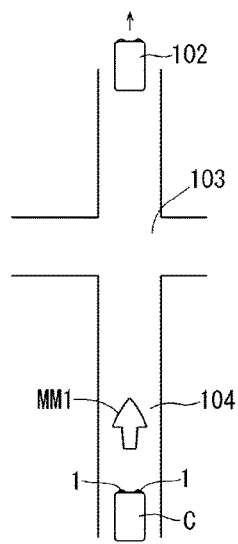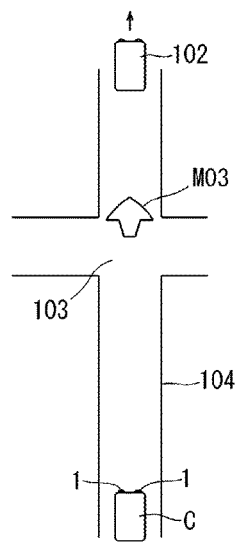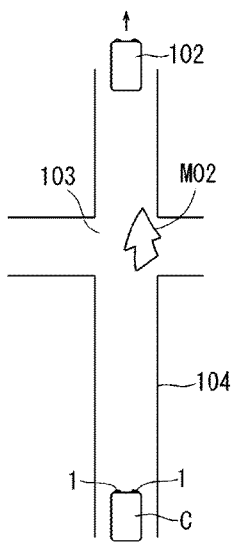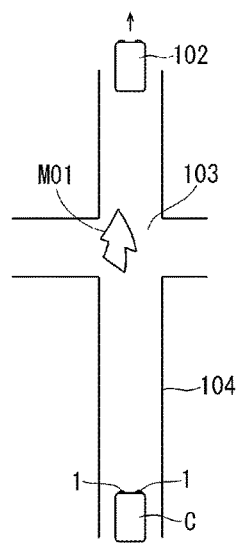

ROAD SURFACE IMAGE-DRAWING SYSTEM FOR VEHICLE

TECHNICAL FIELD

The present invention relates to a road surface image-drawing system which is mounted on a vehicle and draws information regarding the vehicle or the like on a road surface.

BACKGROUND ART

There is known a vehicle display system for notifying/warning information of a vehicle to a driver himself or other person such as a pedestrian/oncoming vehicle by illuminating (drawing) a figure or a character or the like on a road surface. For example, a vehicle display system disclosed in Patent Document 1 is configured to notify/warn the approach of an own vehicle to other person trying to enter an intersection by displaying a warning mark of a figure on a road surface at the intersection.

CITATION LIST

Patent Document

Patent Document 1: Japanese Patent Publication No. 2009-184428

DISCLOSURE OF INVENTION

Problems to be Solved by Invention

However, the viewpoints of the driver of the own vehicle and other person receiving the warning are different from each other. Therefore, the display made by the system disclosed in Patent Document 1 may be distorted to the driver even when it is appropriate for other person receiving the warning. As a result, the driving comfort may be impaired.

The present invention aims to provide a suitable display to both a driver of a vehicle providing information such as a warning and other person receiving the information.

Means for Solving the Problems

In order to solve the above problem, one aspect of the present invention may provide a road surface image-drawing system mounted on a vehicle. The road surface image-drawing system includes:

an image-drawing device configured to draw a first display to be visible to a driver of the vehicle at a first position and draw a second display to be visible to a person other than the driver at a second position different from the first position, and a control device configured to correct a shape of the first display according to a positional relationship between the first position and the driver and correct a shape of the second display according to a positional relationship between the second position and the person other than the driver.

For example, the first position and the second position are on a road. In this case, the first position may be on the road located between an intersection and the vehicle. The second position may be on the intersection. Alternatively, the first position may be on a windshield of the vehicle.

According to such a configuration, the first display can be drawn so as to have a distortion free shape, as seen from the driver of the vehicle on which the system is mounted. On the other hand, the second display can be drawn so as to have a distortion-free shape, as seen from the person other than the driver. Accordingly, it is possible to provide a display including information such as a warning in a suitable manner to both the driver of the vehicle who provides the information and the person who receives the information. Particularly, the driver who views the first display can continue driving without diverting his attention to the second display.

It is desirable that the information included in the first display and the information included in the second display are related to each other. For example, the first display may include information or warning notifying the approach of other person to the driver. On the other hand, the second display may include information or warning notifying the approach of the vehicle to the other person. That is, the first display and the second display which are related to each other for the purpose of avoiding collision between the vehicle and the other person may be presented in a manner corresponding to the situation of each of the driver of the vehicle and the other person. Therefore, it is possible to properly call attention of both the driver and the other person.

BRIEF DESCRIPTION OF DRAWINGS

FIG. 8A is a view showing an example of the image-drawing operation executed by the road surface image-drawing system.

FIG. 8B is a view showing an example of the image-drawing operation executed by the road surface image-drawing system.

FIG. 8C is a view showing an example of the image-drawing operation executed by the road surface image-drawing system.

FIG. 8D is a view showing an example of the image-drawing operation executed by the road surface image-drawing system.

EMBODIMENT FOR CARRYING OUT INVENTION

Hereinafter, examples of preferred embodiments will be described in detail with reference to the accompanying figures. In each figure used in the following description, the scale is appropriately changed in order to make each member have recognizable size. The "right" and "left" used in the following description indicate the left and right directions as seen from a driver's seat.

Figure 1:
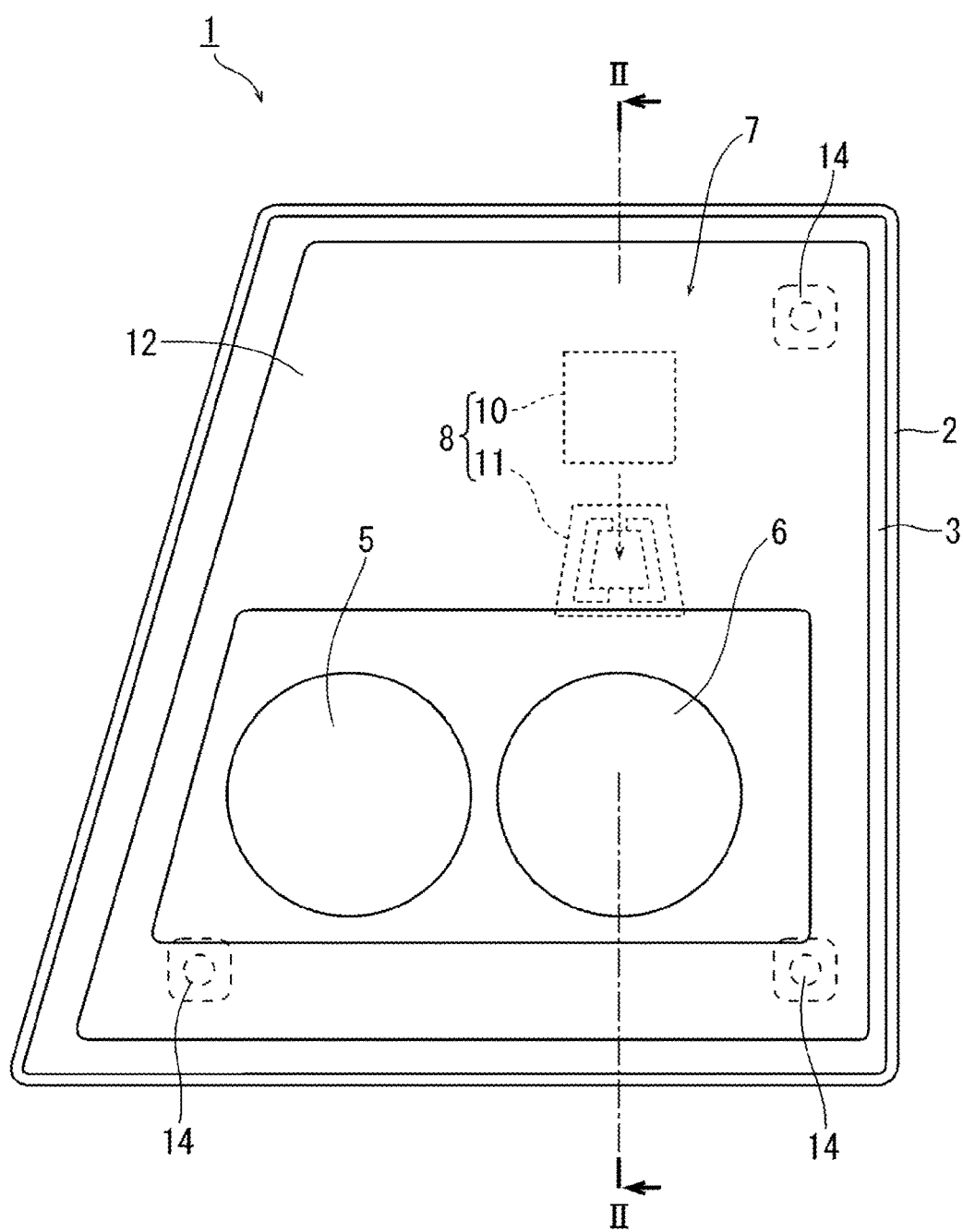
FIG. 1 is a front view showing a headlamp device including a road surface image-drawing system according to one embodiment.
Figure 2:
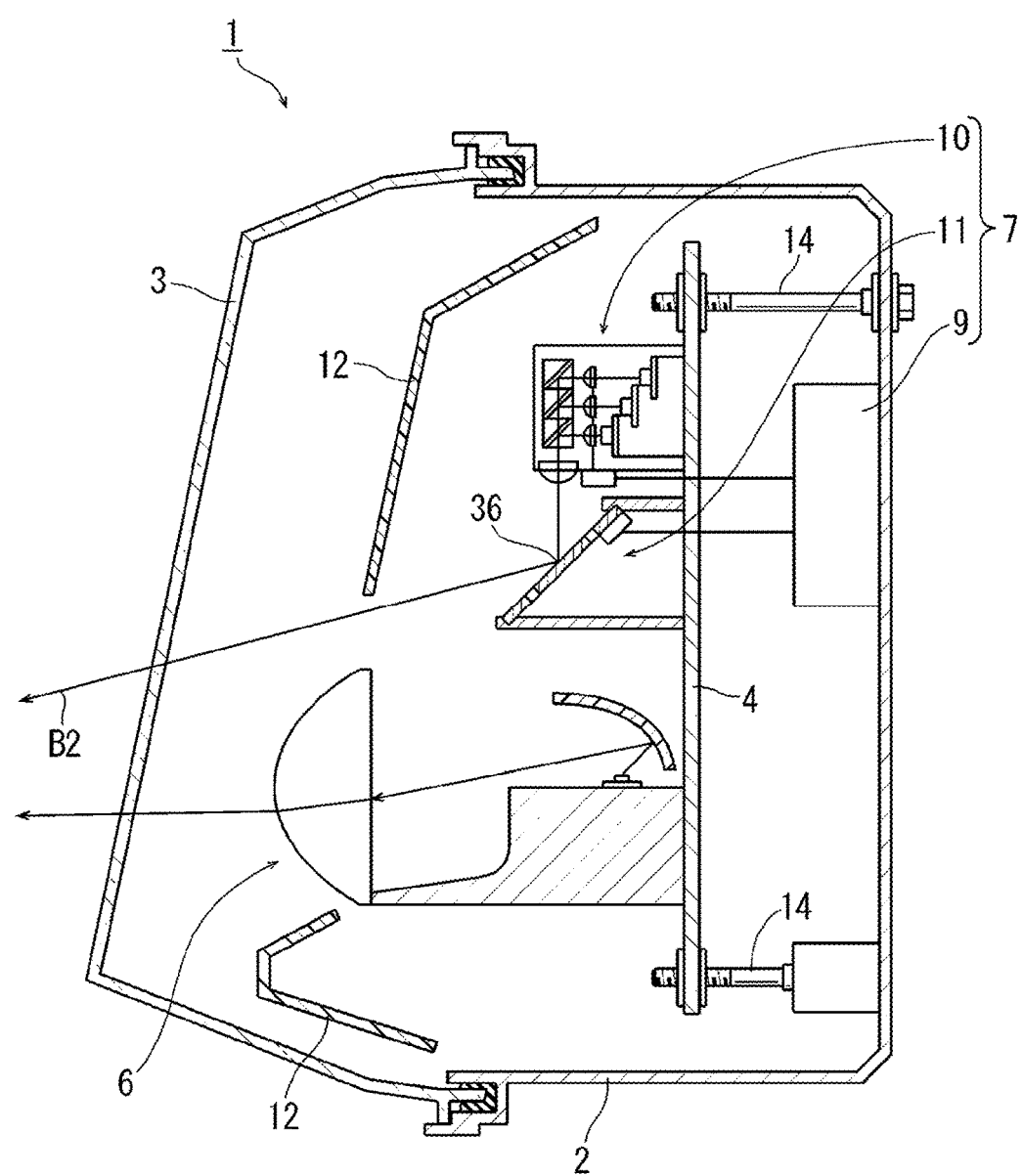
FIG. 2 is a longitudinal sectional view showing the headlamp device.

FIG. 1 is a front view of a headlamp device 1 according to one embodiment. FIG. 2 shows a longitudinal section of the headlamp device 1, when seeing a line II-II in FIG. 1 from an arrow direction. The headlamp device 1 is a right headlamp device mounted on the right front part of a vehicle. Although not shown, a left headlamp device mounted on the left front part of the vehicle has a configuration bilaterally-symmetric to the headlamp device 1 shown in FIG. 1.

The headlamp device 1 includes a housing 2 and a translucent cover 3. The housing 2 has an opening portion. The translucent cover 3 is formed of a light-transmitting resin or glass or the like. The translucent cover 3 is attached to the opening portion of the housing 2 and defines a lamp chamber.

The headlamp device 1 further includes a high-beam light source unit 5 and a low-beam light source unit 6. The high-beam light source unit 5 and the low-beam light source unit 6 are accommodated in the lamp chamber. The high-beam light source unit 5 in the present example is a reflection type and is configured to illuminate the front of the vehicle with a high-beam light distribution pattern. The low-beam light source unit 6 in the present example is a projector type and is configured to illuminate the front of the vehicle with a low-beam light distribution pattern. The types of the high-beam light source unit 5 and the low-beam light source unit 6 can be appropriately determined, so long as a desired illumination can be obtained.

The headlamp device 1 includes a bracket 4 and aiming screws 14. The bracket 4 is accommodated in the lamp chamber. The high-beam light source unit 5 and the low-beam light source unit 6 are supported by the bracket 4. The bracket 4 is fixed to the housing 2 via the aiming screws 14. The aiming screws 14 are provided at three corner portions of the bracket 4. By operating the aiming screws 14 to rotate, the direction of an optical axis of the headlamp device 1 can be adjusted in an up-down direction and a left-right direction.

The headlamp device 1 includes an extension 12. The extension 12 covers each component disposed in the lamp chamber so that these components cannot be visible from the outside while allowing the passage of the light emitted from the high-beam light source unit 5 and the low-beam light source unit 6.

The headlamp device 1 includes a road surface image-drawing system 7. The road surface image-drawing system 7 is accommodated in the lamp chamber. The road surface image-drawing system 7 includes an image-drawing device 8 and a control device 9. The image-drawing device 8 includes a laser light source unit 10 and a scanning mechanism 11. The control device 9 is fixed to the housing 2.

Figure 3A:
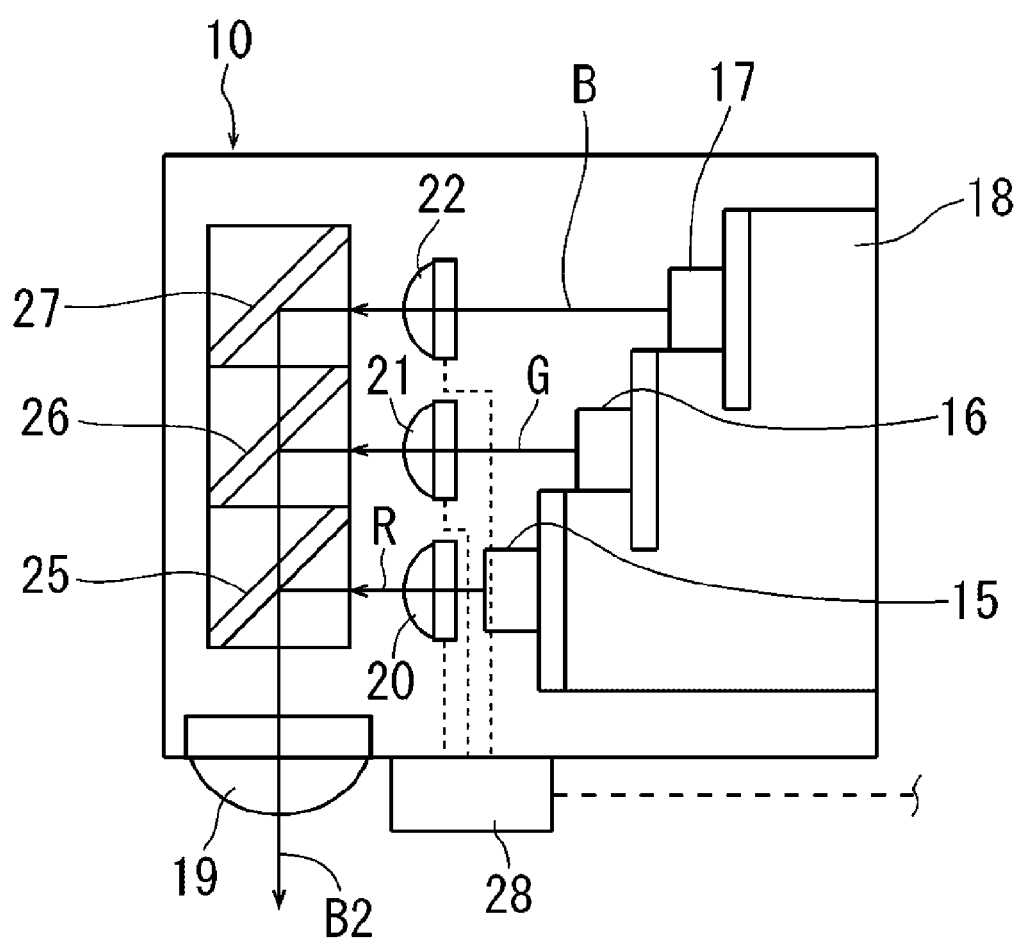
FIG. 3A is a view showing a configuration of an image-drawing device in the road surface image-drawing system.

FIG. 3A schematically shows a configuration of the laser light source unit 10. The laser light source unit 10 includes a first light source 15, a second light source 16, a third light source 17 and a support stand 18. The first light source 15, the second light source 16 and the third light source 17 are supported on the support stand 18.

The first light source 15 is configured to emit a red laser light. The second light source 16 is configured to emit a green laser light. The third light source 17 is configured to emit a blue laser light. In the present embodiment, each of the first light source 15, the second light source 16 and the third light source 17 is a laser diode.

The laser light source unit 10 includes a first condensing lens 20, a second condensing lens 21, a third condensing lens 22, a first dichroic mirror 25, a second dichroic mirror 26 and a third dichroic mirror 27. The red laser light emitted from the first light source 15 is condensed by the first condensing lens 20 and is incident on the first dichroic mirror 25. The green laser light emitted from the second light source 16 is condensed by the second condensing lens 21 and is incident on the second dichroic mirror 26. The blue laser light emitted from the third light source 17 is condensed by the third condensing lens 22 and is incident on the third dichroic mirror 27.

The laser light source unit 10 includes a condensing lens 19. The light reflected by the first dichroic mirror 25, the second dichroic mirror 26 and the third dichroic mirror 27 passes through the condensing lens 19 as an output light B2. By controlling the turn on/off of the first light source 15, the second light source 16 and the third light source 17, the output light B2 can be a monochromatic light, a mixed color light or a white light.

The laser light source unit 10 includes a monitor 28. The monitor 28 is configured to be able to monitor the intensity of the red laser light, the green laser light, the blue laser light and the output light B2. Further, the monitor 28 is configured to be able to control the intensity of the red laser light emitted from the first light source 15, the intensity of the green laser light emitted from the second light source 16 and the intensity of the blue laser light emitted from the third light source 17.

Figure 3B:
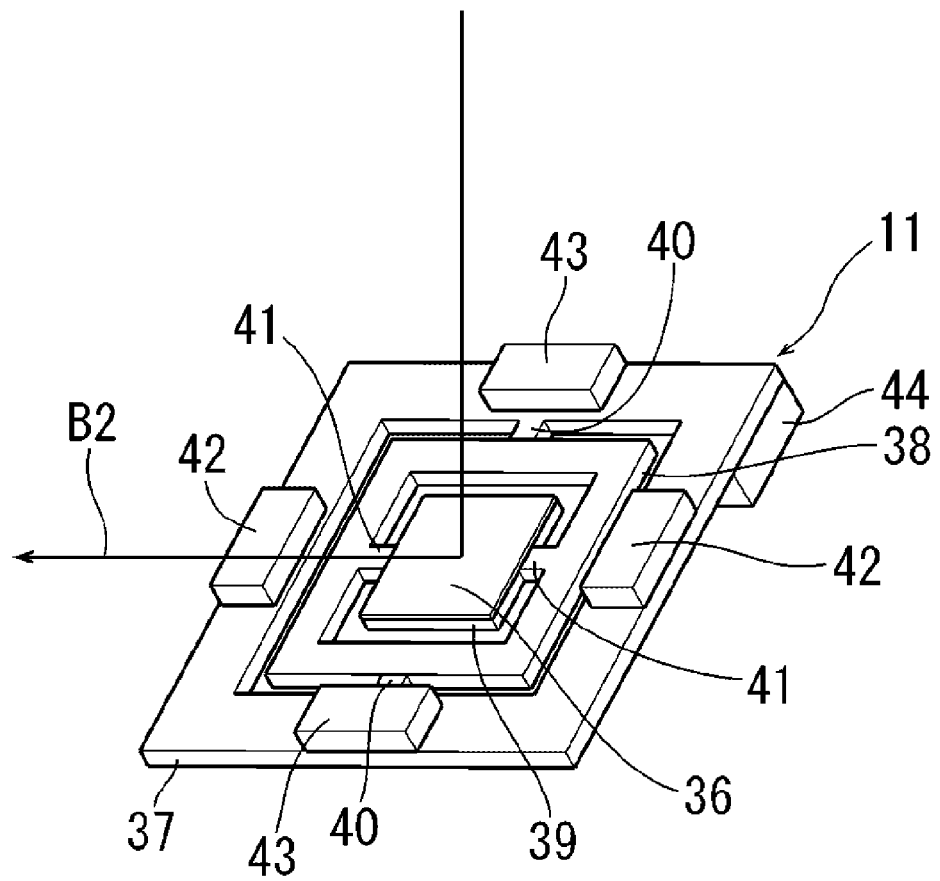
FIG. 3B is a view showing a configuration of the image-drawing device in the road surface image-drawing system.

FIG. 3B shows a configuration of the scanning mechanism 11. The scanning mechanism 11 is configured as an MEMS (Micro Electro Mechanical Systems) mirror. The scanning mechanism 11 includes a base part 37, a first pivoting body 38, a second pivoting body 39, a pair of first torsion bars 40 and a pair of second torsion bars 41.

The base part 37 has a first opening portion. The first pivoting body 38 is disposed in the opening portion and is supported on the base part 37 via the pair of first torsion bars 40. The first pivoting body 38 is pivotable in a left-right (horizontal) direction.

The first pivoting body 38 has a second opening portion. The second pivoting body 39 is disposed in the second opening portion and is supported on the first pivoting body 38 via the pair of second torsion bars 41. The second pivoting body 39 is pivotable in an up-down (vertical) direction. The second pivoting body 39 has a reflective surface 36.

The scanning mechanism 11 includes a pair of first permanent magnets 42, a pair of second permanent magnets 43 and a terminal portion 44.

The pair of first torsion bars 40 is disposed between the pair of first permanent magnets 42. The direction of a straight line connecting the pair of first permanent magnets 42 is orthogonal to the extending direction of the pair of first torsion bars 40.

The pair of second torsion bars 41 is disposed between the pair of second permanent magnets 43. The direction of a straight line connecting the pair of second permanent magnets 43 is orthogonal to the extending direction of the pair of second torsion bars 41.

The first pivoting body 38 includes a first coil (not shown). The second pivoting body 39 includes a second coil (not shown). The first coil and the second coil are electrically connected to the control device 9 via the terminal portion 44.

As shown in FIG. 2, the laser light source unit 10 is fixed to the bracket 4 so that the output light B2 is emitted downward. The scanning mechanism 11 is disposed so that the output light B2 is reflected to the front of the headlamp device 1 by the reflective surface 36.

Figure 4:
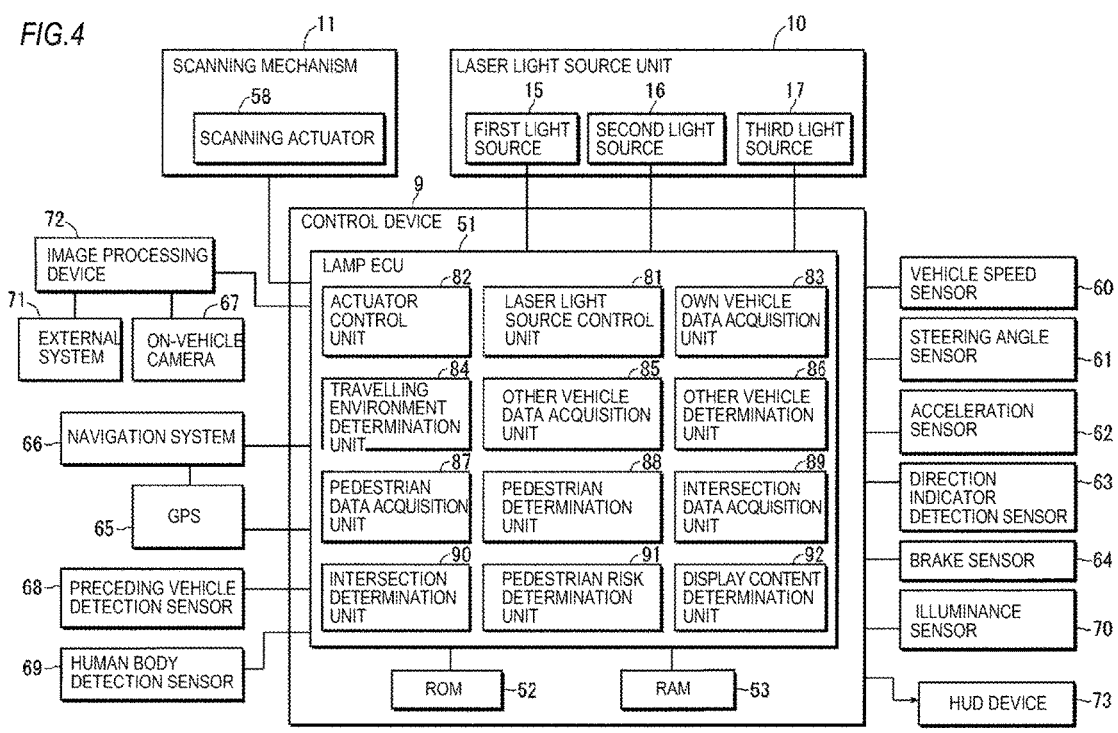
FIG. 4 is a functional block diagram showing a configuration of a control device in the road surface image-drawing system.

As shown in FIG. 4, the scanning mechanism 11 includes a scanning actuator 58. Specifically, the scanning actuator 58 is composed of the pair of first permanent magnets 42, the pair of second permanent magnets 43, the first coil and the second coil. When the magnitude and direction of current flowing in the first coil and the second coil are changed, the pivoting direction and amount of the first pivoting body 38 and the second pivoting body 39 are changed. In this way, the direction of the reflective surface 36 is changed in the up-down direction and the left-right direction.

As shown in FIG. 4, the control device 9 is communicatively connected to a vehicle speed sensor 60, a steering angle sensor 61, an acceleration sensor 62, a direction indicator detection sensor 63, a brake sensor 64, a GPS 65, a navigation system 66, an on-vehicle camera 67, a preceding vehicle detection sensor 68, a human body detection sensor 69, an illuminance sensor 70, an external system 71, and an image processing device 72.

The vehicle speed sensor 60 is configured to detect a travelling distance and a vehicle speed by the rotation of vehicle wheels. The steering angle sensor 61 is configured to detect a steering angle of a steering wheel. The acceleration sensor 62 is configured to detect an operating amount of an accelerator. The direction indicator detection sensor 63 is configured to detect a switch operation of a direction indicator. The brake system 64 is configured to detect an operating amount of a brake. The navigation system 66 is configured to detect a current position of the own vehicle and perform a route guidance to the destination based on a data received from the GPS 65 and a map data. The on-vehicle camera 67 is configured to capture and record an image in front of the own vehicle. The preceding vehicle detection sensor 68 is configured to detect a distance to a preceding vehicle and a relative speed by using millimeter waves or the like. The human body detection sensor 69 is configured to detect a human body located in front of the own vehicle by using infrared rays or the like. The illuminance sensor 70 is configured to detect an illuminance of the surrounding environment of the own vehicle by using the photoelectric effect. As an example of the external system 71, an intersection camera or a monitoring camera installed at intersection signals can be exemplified. The image processing device 72 is configured to perform an image processing on an image data acquired by the on-vehicle camera 67 and the external system 71 and thus to recognize a specific object.

The control device 9 includes a lamp ECU 51, a ROM 52 and a RAM 53. The lamp ECU 51 executes various programs stored in advance in the ROM 52 on the RAM 53, thereby generating various control signals.

The lamp ECU 51 includes an own vehicle data acquisition unit 83. The own vehicle data acquisition unit 83 is configured to receive data from at least one of the vehicle speed sensor 60, the steering angle sensor 61, the acceleration sensor 62, the direction indicator detection sensor 63, the brake sensor 64, the GPS 65, the navigation system 66 and the illuminance sensor 70 and to acquire information on the travelling conditions including the current position of the own vehicle and the surrounding environments.

The lamp ECU 51 includes a travelling environment determination unit 84. The travelling environment determination unit 84 is configured to determine whether image-drawing by the image-drawing device 8 is possible based on the information on the travelling conditions and surrounding environments of the own vehicle acquired by the own vehicle data acquisition unit 83. When it is determined that the image-drawing is possible, the travelling environment determination unit 84 is configured to permit the image-drawing by the image-drawing device 8. When it is determined that the image-drawing is not possible, the travelling environment determination unit 84 is configured to prohibit the image-drawing by the image-drawing device 8.

For example, when the own vehicle is stopped, the travelling environment determination unit 84 determines that the image-drawing is unnecessary, thereby prohibiting the image-drawing. When the own vehicle is travelling at a speed within a predetermined range, the travelling environment determination unit 84 permits the image-drawing. When the speed of the own vehicle exceeds a predetermined value, the travelling environment determination unit 84 determines that effective image-drawing cannot be performed, thereby prohibiting the image-drawing.

As another example, when it is determined that the own vehicle is travelling around a curve to the extent that it cannot perform the effective image-drawing, the travelling environment determination unit 84 prohibits the image-drawing. When it is determined that the own vehicle is travelling on the priority road, the travelling environment determination unit 84 permits the image-drawing. When it is determined that the own vehicle is in an environment in which the image-drawing cannot be effectively performed on the road surface due to a tunnel or rainy weather or the like, the travelling environment determination unit 84 prohibits the image-drawing. When the presence of a signal is detected, the possibility of the run-out by other person is low, and thus, the travelling environment determination unit 84 may determine that the image-drawing is unnecessary in order to make driving easier.

The lamp ECU 51 includes an other vehicle data acquisition unit 85. The other vehicle data acquisition unit 85 is configured to acquire data from at least one of the on-vehicle camera 67, the preceding vehicle detection sensor 68 and the external system 71 and to acquire information on a distance to the other vehicle and a relative speed.

The lamp ECU 51 includes an other vehicle determination unit 86. The other vehicle determination unit 86 is configured to determine whether the image-drawing by the image-drawing device 8 is possible based on the information acquired by the other vehicle data acquisition unit 85 and to determine whether the image-drawing by the image-drawing device 8 is possible. When it is determined that the image-drawing is possible, the other vehicle determination unit 86 is configured to permit the image-drawing by the image-drawing device 8. When it is determined that the image-drawing is not possible, the other vehicle determination unit 86 is configured to prohibit the image-drawing by the image-drawing device 8.

For example, when it is determined that a preceding vehicle is not present, the other vehicle determination unit 86 permits the image-drawing. When it is determined that a preceding vehicle is present, the other vehicle determination unit 86 permits the image-drawing. When it is determined that an image-drawable inter-vehicle distance is secured even if a preceding vehicle is present, the other vehicle determination unit 86 permits the image-drawing. When it is determined that effective image-drawing cannot be performed in consideration of the relative speed even if the image-drawable inter-vehicle distance is secured, the other vehicle determination unit 86 prohibits the image-drawing.

When it is determined that the image-drawing can be performed on the road surface on the side of the preceding vehicle even if the inter-vehicle distance is too short to perform effective image-drawing, the other vehicle determination unit 86 permits the image-drawing.

The lamp ECU 51 includes a pedestrian data acquisition unit 87. The pedestrian data acquisition unit 87 is configured to acquire data from at least one of the on-vehicle camera 67, the human body detection sensor 69 and the external system 71 and to acquire information on the presence of a pedestrian (including a bicycle) and the state (traveling direction, etc.) thereof.

The lamp ECU 51 includes a pedestrian determination unit 88. The pedestrian determination unit 88 is configured to determine the presence/absence of a pedestrian based on the information acquired by the pedestrian data acquisition unit 87.

The lamp ECU 51 includes an intersection data acquisition unit 89. The intersection data acquisition unit 89 is configured to acquire data from at least one of the on-vehicle camera 67 and the navigation system 66 and thus to acquire information on the presence of an intersection and the situations (the presence/absence of a signal, the presence/absence of a road illumination, the presence of obstacles around the intersection, etc.) of the intersection.

The lamp ECU 51 includes an intersection determination unit 90. The intersection determination unit 90 is configured to determine the presence/absence of an intersection based on the information acquired by the intersection data acquisition unit 89. The intersection determination unit 90 can be also configured to determine whether it is an intersection in which the necessity of performing the image-drawing is high, based on the information on the situations of the intersection acquired by the intersection data acquisition unit 89. When it is determined that an intersection is present (when it is determined that the notification or warning by the image-drawing is necessary in consideration of the situations of the intersection), the intersection determination unit 90 permits the image-drawing in the normal mode.

The lamp ECU 51 includes a pedestrian risk determination unit 91. The pedestrian risk determination unit 91 is configured to acquire a distance (hereinafter, referred to as a "pedestrian distance") to a pedestrian based on the position, travelling direction and walking speed or the like of a pedestrian. Further, the pedestrian risk determination unit 91 is configured to acquire a braking distance of the own vehicle based on the position, travelling direction and driving speed or the like of the own vehicle. When the pedestrian distance is equal to or greater than the braking distance, the pedestrian risk determination unit 91 permits the image-drawing in the normal mode. On the other hand, when the pedestrian distance is less than the braking distance, there is a danger of collision, and thus, the pedestrian risk determination unit 91 permits the image-drawing in the emergency mode.

The lamp ECU 51 includes a display content determination unit 92. The display content determination unit 92 is configured to determine display contents when the image-drawing is permitted by the travelling environment determination unit 84, the other vehicle determination unit 86, the pedestrian determination unit 88 or the intersection determination unit 90. Specifically, the display content determination unit 92 is configured to determine a figure or a character to be drawn together with its display form in accordance with the determined situations (including a risk).

Further, the display content determination unit 92 is configured to control the image-drawing device 8, thereby image-drawing the display contents.

The lamp ECU 51 includes a laser light source control unit 81. The laser light source control unit 81 is configured to control the turn on/off and emission light intensity (i.e., color and brightness of output light B2) of each of the first light source 15, the second light source 16 and the third light source 17, based on the display contents determined by the display content determination unit 92.

The lamp ECU 51 includes an actuator control unit 82. The actuator control unit 82 is configured to control an operation of the scanning actuator 58 based on the display contents determined by the display content determination unit 92.

Therefore, through the control by the laser light source control unit 81 and the actuator control unit 82, the output light B2 emitted from the laser light source unit 10 is reflected in a desired direction by the scanning mechanism 11. In this way, the image-drawing device 8 causes desired display contents to be drawn on a road surface located in front of the headlamp device 1 by using the output light B2.

Figure 5:
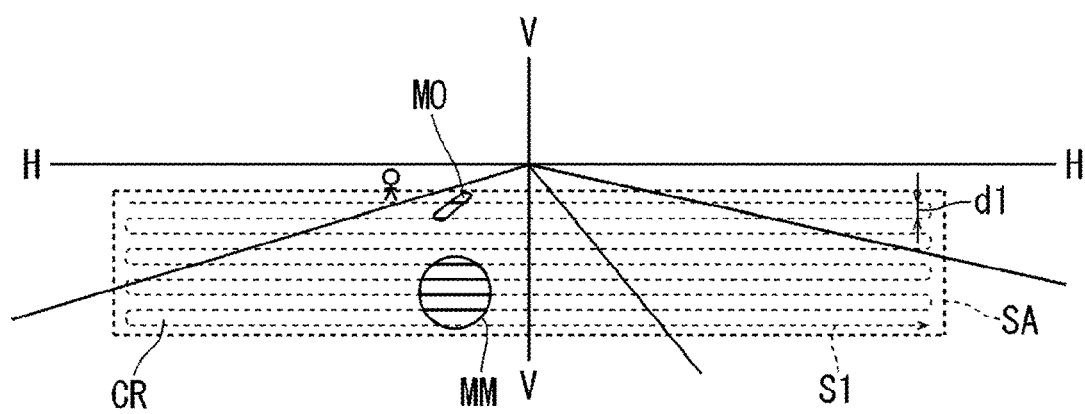
FIG. 5 is a view for explaining an image-drawing operation by the road surface image-drawing system.

Next, a road surface image-drawing operation performed by the road surface image-drawing system 7 will be described with reference to FIG. 5. FIG. 5 shows a virtual vertical screen positioned in front of the headlamp device 1. A reference numeral "CR" indicates a travelling lane of the own vehicle.

The scanning mechanism 11 of the image-drawing device 8 is configured so that the output light B2 can scan the inside of a rectangular scanning area SA shown in FIG. 5. The scanning area SA is preferably set such that it can cover a road shoulder of the travelling lane CR, a lane adjacent to the travelling lane CR and the range of 5 m to 50 m in front of the own vehicle. For example, it is preferable that the scanning area SA is set to the left-right direction range of $-1°$ to $-8°$ on a horizontal line H-H shown in FIG. 5 and the up-down direction range of $20°$ to $-20°$ on a vertical line V-V shown in FIG. 5.

The control device 9 controls an operation of the image-drawing device 8 to cause a display MM for a driver and a display MO for other person to be drawn at different places in the scanning area SA, respectively. The display MM (an example of the first display) for the driver is a display to be visible to the driver of the own vehicle. The display MO (an example of the second display) for the other person is a display to be visible to a person other than the driver of the own vehicle, such as a pedestrian or a driver of a preceding vehicle. The display MM for the driver and the display MO for the other person are based on the display contents determined by the display content determination unit 92 of the control device 9. The display MM for the driver and the display MO for the other person may be drawn in a partially overlapping manner, as long as each of them includes a different point in the scanning area SA.

The scanning mechanism 11 of the image-drawing device 8 changes the orientation of the reflective surface 36 based on a control signal from the actuator control unit 82 of the control device 9. In this way, the scanning point can be horizontally reciprocated in the scanning area SA while shifting its position in the vertical direction by dl. A reference numeral "S1" in FIG. 5 indicates a movement trajectory of the scanning point.

When the scanning point reaches the image-drawing positions of the display MM for the driver and the display MO for the other person, at least one of the first light source 15, the second light source 16 and the third light source 17 is turned on (part indicated by a solid line, out of the movement trajectory S1 of the scanning point shown in FIG. 5) on the basis of the control signal from the laser light source control unit 81 of the control device 9. In this way, the display MM for the driver and the display MO for the other person are drawn at desired positions by using the output light B2. When the scanning point is located at positions other than the drawing positions of the display MM for the driver and the display MO for the other person, all of the first light source 15, the second light source 16 and the third light source 17 are turned off (part indicated by a broken line, out of the movement trajectory S1 of the scanning point shown in FIG. 5).

The road surface image-drawing system 7 repeatedly performs the scanning of one cycle shown in FIG. 5 and appropriately determines the drawing positions of the display MM for the driver and the display MO for the other person in each cycle. In this way, the display MM for the driver and the display MO for the other person with an arbitrary shape can be continuously or intermittently displayed in the scanning area SA. The road surface image-drawing system 7 appropriately changes the drawing positions of the display MM for the driver and the display MO for the other person in each cycle. In this way, the display form of the display MM for the driver and the display MO for the other person can be dynamically changed.

Figure 6:
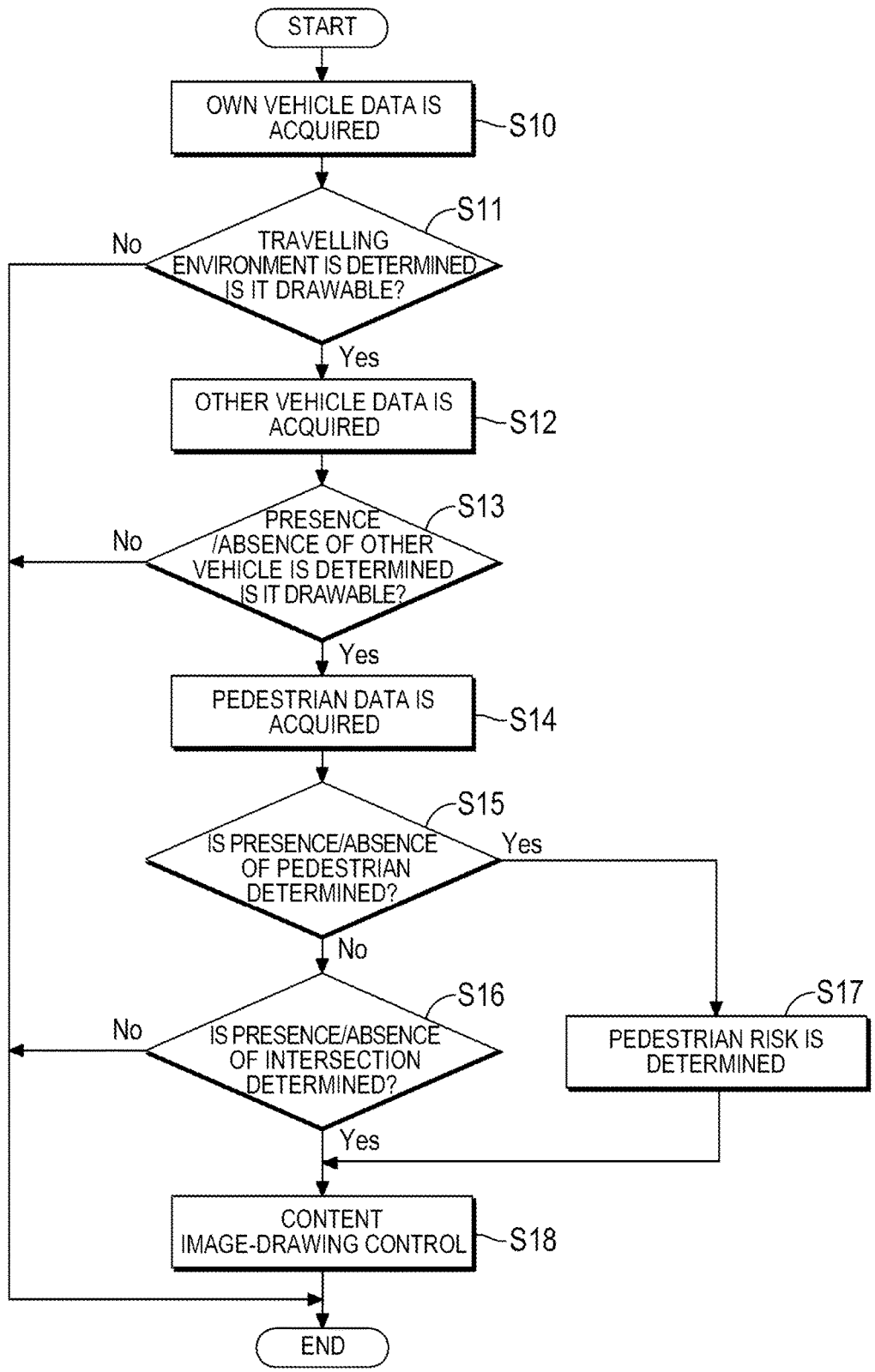
FIG. 6 is a flow chart showing a control process executed by the road surface image-drawing system.
Figure 7:
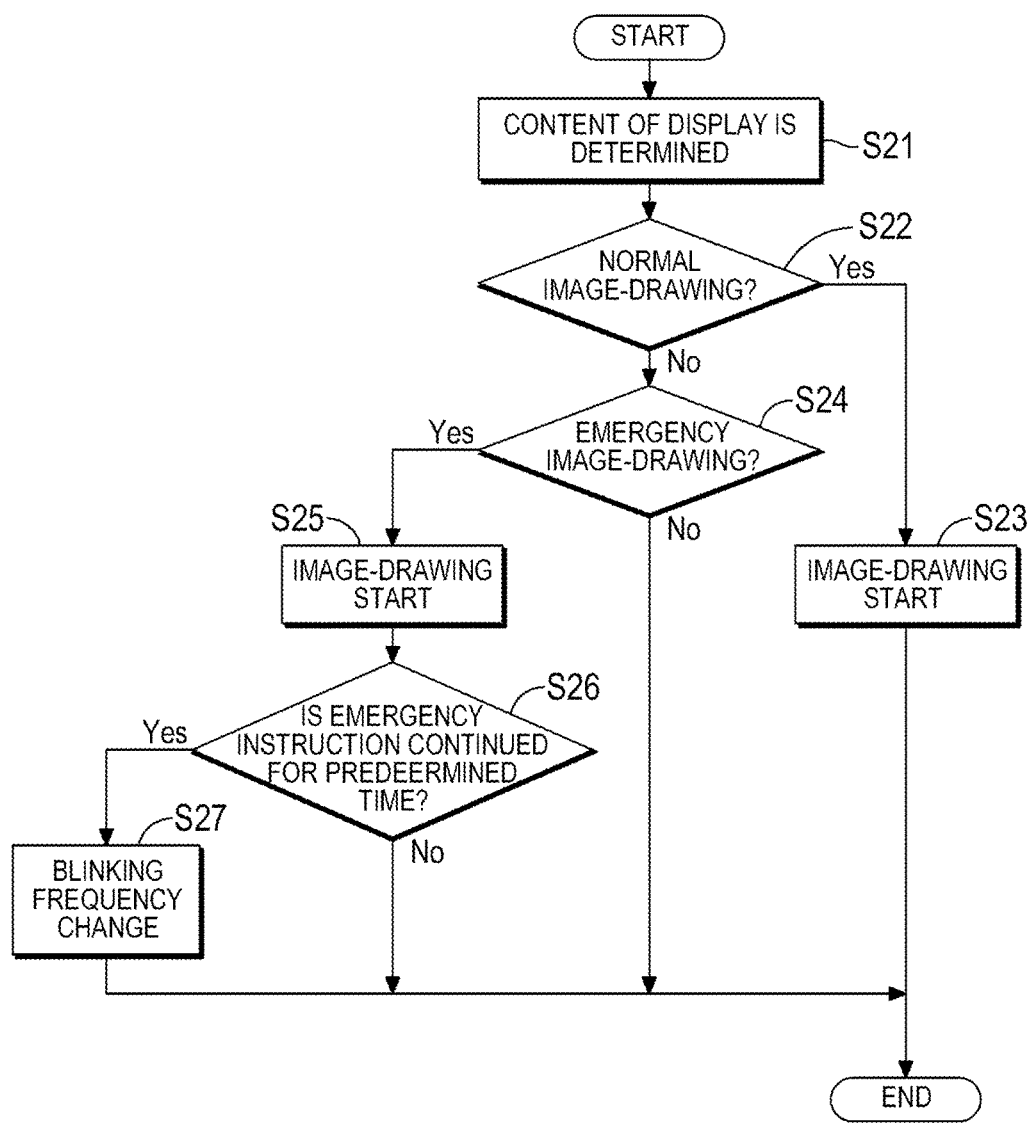
FIG. 7 is a flow chart showing a control process executed by the road surface image-drawing system.

Next, an operation of the road surface image-drawing system 7 will be described in more detail with reference to the flow charts shown in FIGS. 6 and 7.

When the road surface image-drawing system 7 is activated at a predetermined timing, information on the travelling conditions and surrounding environments of the own vehicle is acquired by the own vehicle data acquisition unit 83 (Step S10). Then, when it is determined by the travelling environment determination unit 84 based on the information that the image-drawing is possible (Step S11: YES), the process proceeds to Step S12. When it is determined by the travelling environment determination unit 84 that the image-drawing is not possible (Step S11: NO), the image-drawing is not performed.

Subsequently, information on a distance to a preceding vehicle and a relative speed is acquired by the other vehicle data acquisition unit 85 (Step S12). Then, when it is determined by the other vehicle determination unit 86 based on the information that image-drawing is possible or partial image-drawing is possible (Step S13: YES), the process proceeds to Step S14. When it is determined by the other vehicle determination unit 86 that the image-drawing is not possible (Step S13: NO), the image-drawing is not performed.

Subsequently, information on a pedestrian is acquired by the pedestrian data acquisition unit 87 (Step S14). Then, when it is determined by the pedestrian determination unit 88 based on the information that a pedestrian is present (Step S15: YES), the process proceeds to Step S17. When it is determined by the pedestrian determination unit 88 that a pedestrian is not present (Step S15: NO), the process proceeds to Step S16.

In Step S16, information on an intersection is acquired by the intersection data acquisition unit 89. When it is determined by the intersection determination unit 90 based on the information that an intersection is present (Step S16: YES), an instruction to perform image-drawing in the normal mode is issued and the process proceeds to Step S18. When it is determined by the intersection determination unit 90 that an intersection is not present (Step S16: NO), image-drawing is not performed and the process is repeated from the Step S10 again.

In Step S17, a pedestrian distance and a braking distance are acquired by the pedestrian risk determination unit 91. When the pedestrian distance is equal to or greater than the braking distance, an instruction to perform image-drawing in the normal mode is issued and the process proceeds to Step S18. When the pedestrian distance is less than the braking distance, an instruction to perform image-drawing in the emergency mode is issued and the process proceeds to Step S18.

The Step S18 is performed when image-drawing permission is made in previous Step S11 and Step S13 and image-drawing permission is made in Step S15 or S16. In Step S18, "display contents" are determined by the display content determination unit 92. FIG. 7 shows details of the process performed by the display content determination unit 92 in Step S18.

In Step S21, a figure or character or the like to be drawn as the display MO for the other person and an image-drawing area thereof and a figure or character or the like to be drawn as the display MM for the driver and an image-drawing area thereof are determined in accordance with the situations corresponding to the data acquired in previous steps (Step S10 to Step S16).

When the display MO for the other person is presented to a pedestrian, the display content determination unit 92 performs a trapezoidal distortion correction on the figure or character or the like to be drawn as the display MO for the other person so that a distortion-free shape is obtained as seen from the detected pedestrian. When the display MO for the other person is presented to a driver of a preceding vehicle, the display content determination unit 92 performs a trapezoidal distortion correction on the figure or character or the like to be drawn as the display MO for the other person so that a distortion-free shape is obtained as seen from the driver of the preceding vehicle detected. In other words, the display content determination unit 92 corrects the shape of the display MO for the other person based on a positional relationship between the detected other person (person other than the driver of the own vehicle) and the image-drawing area of the display MO for the other person.

Further, the display content determination unit 92 performs a trapezoidal distortion correction on the figure or character or the like to be drawn as the display MM for the driver so that a distortion-free shape is obtained as seen from the driver of the own vehicle. The trapezoidal distortion correction is performed on the basis of an installation height of the headlamp device 1 or a distance to the image-drawing area or the like. In other words, the display content determination unit 92 corrects the shape of the display MM for the driver based on a positional relationship between the driver of the own vehicle and the drawing area of the display MM for the driver.

Subsequently, the display content determination unit 92 sequentially determines whether an instruction to perform the image-drawing in the normal mode in previous steps (Step S16 to Step S17) is issued (Step S22) and whether an instruction to perform the image-drawing in the emergency mode is issued (Step S24). When the instruction to perform the image-drawing is not issued (Step S22 and Step S23: NO), image-drawing is not performed and the process is repeated from the Step S10 again.

When the instruction to perform the image-drawing in the normal mode is issued (Step S22: YES), the image-drawing is performed such that the figure or character or the like determined in the image-drawing area determined in Step S21 is constantly displayed or is displayed with slow blinking (Step S23).

When the instruction to perform the image-drawing in the emergency mode is issued (Step S24: YES), the image-drawing is performed such that the figure or character or the like determined in the image-drawing area determined in Step S21 is displayed with fast blinking. The blinking frequency of the display in the emergency mode image-drawing is faster than that of the display in the normal mode image-drawing. The blinking frequency of the display in the emergency mode image-drawing is, for example, 1 Hz.

Subsequently, it is determined whether the instruction to perform the image-drawing in the emergency mode is continued for a predetermined time or more (Step S26). When it is determined that the instruction to perform the image-drawing in the emergency mode is continued for the predetermined time or more (Step S26: YES), the blinking frequency is changed so as to rise (Step S27). For example, when the initial fast blinking (1 Hz) is continued for the predetermined time or more, the blinking frequency is increased by 1 Hz. For example, the image-drawing is performed such that this processing is repeated until the blinking frequency becomes 4 Hz. This is repeatedly performed, for example, up to 4 Hz. When the instruction to perform the image-drawing in the emergency mode is not continued for the predetermined time or more (Step S26: NO), the image-drawing in the initial fast blinking state is continued.

A preferred example of display by the road surface image-drawing system 7 having the above configuration will be described with reference to FIGS. 8A to 10.

FIGS. 8A to 8D show an example where the road surface image-drawing is performed at an intersection by the road surface image-drawing system 7. FIGS. 8A to 8D schematically show a state of an intersection 103 seen from above. In the present example, the travelling environment determination unit 84 determines that the travelling conditions and the surrounding environments are in the state of capable of performing the image-drawing (Step S11: YES). The other vehicle data acquisition unit 85 determines that an image-drawable distance (e.g., 50 m) is secured although a preceding vehicle 102 is present (Step S13: YES). The pedestrian data acquisition unit 87 determines that a pedestrian is not present (Step S15: NO). The intersection determination unit 90 determines that an intersection is present (e.g., at 30 m) in front of the own vehicle C (Step S16: YES). Therefore, an instruction to perform the image-drawing in the normal mode is issued.

Based on these conditions, display contents are determined (Step S21). Specifically, it is determined that a "rectilinear arrow" for informing the other person that the own vehicle C goes straight through the intersection 103 is drawn at the intersection 103 (an example of the second position) as the display for the other person. Further, it is determined that a "rectilinear arrow" for informing the driver of the own vehicle C of the same information as the display for the other person is drawn on a road 104 (an example of the first position) as the display for the driver. The road 104 is positioned between the own vehicle C and the intersection 103.

As shown in FIG. 8A, a straight arrow MO1 as the display for the other person is drawn in a left end region of the intersection 103. The shape of the straight arrow MO1 is corrected so that it can be seen without distortion, as viewed from a driver of other vehicle or a pedestrian who is likely to enter the intersection 103 from the left side.

As shown in FIG. 8B, a straight arrow MO2 as the display for the other person is drawn in a right end region of the intersection 103. The shape of the straight arrow MO2 is corrected so that it can be seen without distortion, as viewed from a driver of other vehicle or a pedestrian who is likely to enter the intersection 103 from the right side.

As shown in FIG. 8C, a straight arrow MO3 as the display for the other person is drawn in a front end region of the intersection 103. The shape of the straight arrow MO3 is corrected so that it can be seen without distortion, as viewed from a driver of other vehicle or a pedestrian who is likely to enter the intersection 103 from the front side.

As shown in FIG. 8D, a straight arrow MM1 as the display for the driver is drawn on the road 104. The shape of the straight arrow MM1 is corrected so that it can be seen without distortion, as viewed from the driver of the own vehicle C.

According to these displays, the straight arrows MO1, MO2, MO3 as the displays for the other person are presented without distortion to the other person approaching the intersection 103. Therefore, the other person can accurately recognize the fact that the own vehicle C is approaching the intersection 103. On the other hand, the display for the driver related to the display for the other person is presented without distortion to the driver of the own vehicle C. Therefore, the driver of the own vehicle C can continue driving without diverting his attention to the display for the other person.

The straight arrows MO1, MO2, MO3 as the displays for the other person are preferably displayed to be large in the full width of the intersection 103 in order to enhance the effect of calling attention. On the other hand, the straight arrow MM1 as the display for the driver is preferably spot-displayed on the tip of line of sight of the driver of the own vehicle C. The line of sight of the driver is detected by, for example, an eye camera connected to the lamp ECU 51.

The timing at which the straight arrows MO1, MO2, MO3 as the displays for the other person and the straight arrow MM1 as the display for the driver are drawn can be appropriately determined. These displays may be sequentially drawn one by one, or, at least two of these displays may be simultaneously drawn when the image-drawing areas thereof are not overlapped. When the displays are sequentially drawn, the image-drawing time of each display and the number of scanning cycles described with reference to FIG. 5 can be appropriately determined. For example, the display to be drawn per one scanning cycle may be switched or a specific display may be drawn over a plurality of scanning cycles. When the displays are sequentially drawn, the order in which each display is drawn can be appropriately determined.

Figure 9:
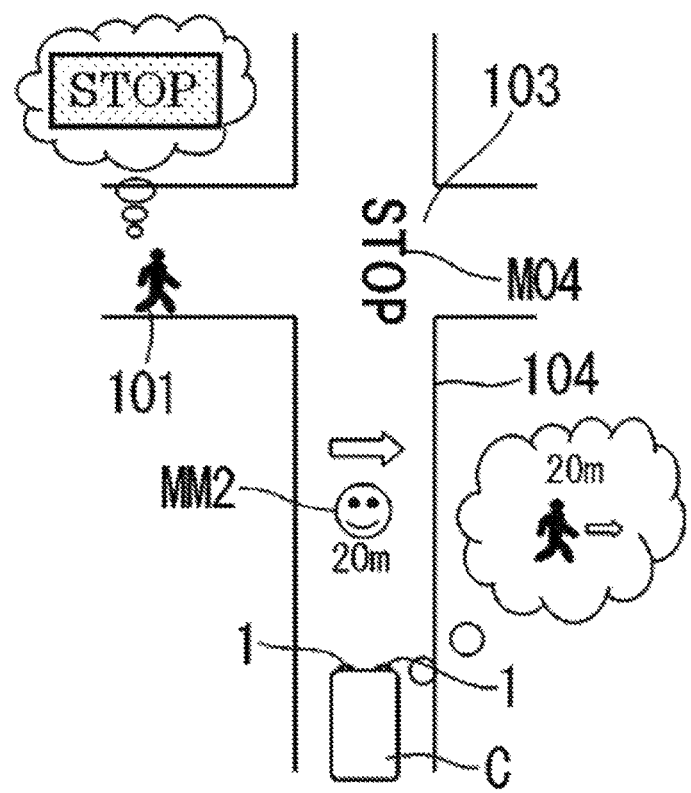
FIG. 9 is a view showing another example of the image-drawing operation executed by the road surface image-drawing system.

FIG. 9 shows another example in which the road surface image-drawing is performed at the intersection by the road surface image-drawing system 7. FIG. 9 schematically shows a state of the intersection 103 seen from above. In this example, the pedestrian determination unit 88 determines that a pedestrian 101 trying to enter the intersection 103 is present (Step S15: YES). The pedestrian risk determination unit 91 determines that the distance (e.g., 20 m) between the own vehicle C and the pedestrian 101 is equal to or greater than the braking distance (e.g., 13 m) of the own vehicle C (Step S17). Therefore, an instruction to perform the image-drawing in the normal mode is issued.

Based on these conditions, display contents are determined (Step S21). Specifically, it is determined that the character of "STOP" for urging not to enter the intersection 103 is drawn at the intersection 103 as the display for the other person. Further, it is determined that a mark for informing the driver of the own vehicle C of the presence of the pedestrian 101 trying to enter the intersection 103 is drawn on the road 104 as the display for the driver.

As shown in FIG. 9, a character MO4 (an example of the second display) of "STOP" as the display for the other person is drawn at the intersection 103 (an example of the second position). The shape of the character MO4 is corrected so that it can be seen without distortion, as viewed from the pedestrian 101 trying to enter the intersection 103 from the left side.

On the other hand, a mark MM2 (an example of the first display) indicating the presence of the pedestrian 101, the pedestrian distance (20 m) and the approaching direction to the intersection 103 is drawn on the road 104 (an example of the first position) as the display for the driver. The shape of the mark MM2 is corrected so that it can be seen without distortion, as viewed from the driver of the own vehicle C.

According to these displays, the character MO4 as the display for the other person is presented without distortion to the pedestrian 101 approaching the intersection 103. Therefore, the pedestrian 101 can accurately recognize the fact that the own vehicle C is approaching the intersection 103. On the other hand, the mark MM2 related to the display for the other person is presented without distortion to the driver of the own vehicle C. Therefore, the driver of the own vehicle C can continue driving without diverting his attention to the display for the other person and can accurately recognize the fact that the pedestrian 101 is approaching the intersection 103.

Further, in the present example, the character MO4 as the display for the other person is intended to inform the pedestrian 101 of the approach of the own vehicle C to the intersection 103 and the mark MM2 as the display for the driver is intended to inform the driver of the own vehicle C of the approach of the pedestrian 101 to the intersection 103. That is, information for avoiding collision at the intersection 103 is presented in a manner corresponding to the situation of each of the driver of the own vehicle C and the pedestrian 101. Therefore, it is possible to properly call attention of both the driver of the own vehicle C and the pedestrian 101.

A case in which the pedestrian 101 overlooks the character MO4 as the display for the other person and further approaches the intersection 103 from the situation shown in FIG. 9 will be described as an example.

The pedestrian risk determination unit 91 determines that the distance (e.g., 10 m) to the pedestrian 101 is less than the braking distance (e.g., 13 m) of the own vehicle C (Step S17). Therefore, an instruction to perform the image-drawing in the emergency mode is issued.

Based on these conditions, display contents are determined (Step S21). Specifically, it is determined that the character MO4 and the mark MM2 are blinked at a high speed. Display contents with higher warning than the character MO4 and the mark MM2 may be selected.

Based on the determined display contents, the image-drawing in the emergency mode is performed (Steps S24 and S25). In the case where the instruction to perform the image-drawing in the emergency mode is continued for a predetermined time (e.g., one second) (Step S26: YES), the blinking frequency is increased (Step S27).

The above description is intended to facilitate the understanding of the present invention and does not limit the present invention. It is obvious that the present invention can be changed/enhanced without departing from the spirit thereof and equivalents thereof are included in the present invention.

The forms of the displays MO1, MO2, MO3, MO4 for the other person are not limited to the examples described for the above embodiment. Any suitable form can be adopted according to the situations, so long as it can notify the other person of the approach or behavior of the own vehicle. For example, more detailed information such as an operation of a brake or a steering wheel by the driver of the own vehicle, acceleration of the own vehicle and driver's attribute information (sex or whether he is a child or an elderly person) may be included in the display for the other person. Alternatively, when the own vehicle data acquisition unit 83 determines that the driver of the own vehicle recognizes the other person such as a pedestrian based on the brake operation, travelling speed and information from the eye camera or the like, the content notifying the fact may be included in the display for the other person.

The forms of the displays MM1, MM2 for the driver are not limited to the examples described for the above embodiment. Any suitable form can be adopted according to the situations, so long as it can notify the driver of the own vehicle of the presence or behavior of the other person. For example, more detailed information such as the number and attribute (sex or whether he is a child or an elderly person) of the pedestrian acquired by the pedestrian data acquisition unit 87 may be included in the display for the driver. Alternatively, when the pedestrian data acquisition unit 87 determines that the pedestrian recognizes the own vehicle, the content notifying the fact may be included in the display for the driver.

The display for the other person and the display for the driver are based on mutually related information. In order to emphasize this relevance, a line connecting the display for the other person and the display for the driver may be drawn.

A region that looks relatively dark may be drawn so as to border the display for the other person and the display for the driver. Specifically, the region may be drawn with a color which has brightness or saturation lower than the colors of the display for the other person and the display for the driver or a color which makes the colors of the display for the other person and the display for the driver stand out. In this way, the display for the other person and the display for the driver appear to emerge, and thus, visibility is improved.

In the above embodiment, the necessity of the image-drawing operation in the emergency mode is determined from a relationship between the distance from the own vehicle to the pedestrian and the braking distance of the own vehicle. However, as a condition for performing the image-drawing operation in the emergency mode, suitable conditions such as when the own vehicle accelerates or suddenly decelerates, when the pedestrian jumps ahead of the own vehicle and when the distance to the intersection is less than a predetermined value may be adopted.

In the image-drawing operation in the emergency mode, the blinking of the display for the other person and the display for the driver do not need to be synchronized. From the viewpoint of calling attention to other person, the blinking frequency of the display for the other person may be higher than that of the display for the driver.

In the image-drawing operation in the emergency mode, the brightness of the display for the other person and the display for the driver does not need to be the same. From the viewpoint of calling attention to other person, the display for the other person may be brighter than the display for the driver.

In the image-drawing operation in the emergency mode, the change of the display mode is not limited to the change of blinking frequency of the display. As the emergency increases, the brightness of the display may be increased or the color sense of the display may be changed.

The display for the other person and the display for the driver described with reference to FIGS. 8A to 9 do not need to be continued throughout the execution period of the image-drawing operation by the image-drawing device 8. It is also possible to adopt a configuration in which only a spotlight-like display is drawn on the road 104 when the distance to the intersection 103 is equal to or greater than a predetermined value and a display of the form illustrated in FIGS. 8A to 9 is drawn when the distance to the intersection 103 is less than the predetermined value.

In the above embodiment, the display for the other person and the display for the driver are drawn on the road in the travelling direction of the own vehicle C. However, when the own vehicle data acquisition unit 83 detects, through the steering angle sensor 61 or the direction indicator detection sensor 6, that the own vehicle C performs its course change, at least one of the display for the other person and the display for the driver can be drawn on the road after the course change.

The display for the other person and the display for the driver may be individually stopped at the discretion of the driver. For example, a switch for releasing the image-drawing operation can be provided in the own vehicle. Alternatively, it is also possible to adopt a configuration in which the image-drawing operation is automatically canceled when a passing operation, a winker operation, a hazard lamp operation, a switching operation to a first speed in a manual transmission vehicle or an off operation of a first speed switch, or the like is performed.

Figure 10:
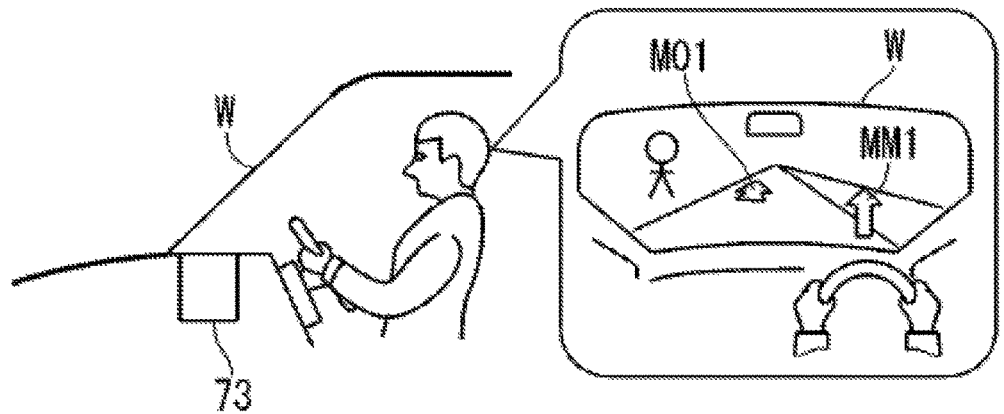
FIG. 10 is a view for explaining a modified example of the road surface image-drawing system.

The whole of the road surface image-drawing system 7 is not necessarily provided in the headlamp device 1. For example, as shown in FIG. 10, the image-drawing device 8 can include a head up display (HUD) device 73. As shown in FIG. 4, the HUD device 73 can be connected to the lamp ECU 51. The HUD device 73 is configured to project the display MM (an example of the first display) for the driver on the windshield W (an example of the first position) of the own vehicle C. In the present specification, an operation of projecting a predetermined display on an object is also considered as an example of the "image-drawing".

According to this configuration, the driver of the own vehicle C can visually recognize the display MM for the driver in a state of being overlaid on the front landscape seen through the windshield W. Therefore, the driver of the own vehicle C can visually recognize the display MM for the driver in a reliable manner, regardless of the state of the road surface.

The road surface image-drawing system 7 may be provided in any one of the left and right headlamp devices. When the road surface image-drawing system 7 is provided in each of the left and right headlamp devices, the road surface image-drawing systems 7 on the left and right sides can perform different image-drawing operations. For example, as shown in FIG. 9, when a pedestrian is present on the left side of the intersection 103 or is supposed to be on the left side, the character MO4 may be drawn by the road surface image-drawing system 7 provided in the left headlamp device and the mark MM2 may be drawn by the road surface image-drawing system 7 provided in the right headlamp device. On the contrary, when a pedestrian is present on the right side of the intersection 103 or is supposed to be on the right side, the character MO4 may be drawn by the road surface image-drawing system 7 provided in the right headlamp device and the mark MM2 may be drawn by the road surface image-drawing system 7 provided in the left headlamp device.

The whole of the road surface image-drawing system 7 may be disposed outside the headlamp device 1. For example, the road surface image-drawing system 7 can be disposed on a roof of the own vehicle such that an emission direction of the output light B2 is directed forward.

The configuration of the laser light source unit 10 can be appropriately changed in accordance with the specifications of the headlamp device 1. Instead of the first light source 15, the second light source 16 and the third light source 17 for emitting light of three colors in the above embodiment, a single light source for emitting a white light can be used. Alternatively, a configuration that a white light is emitted through excitation by making a blue laser light incident on a yellow phosphor may be adopted. Further, a fourth light source for emitting an orange light may be added. Meanwhile, the first light source 15, the second light source 16 and the third light source 17 may be laser light sources other than laser diodes.

Instead of the MEMS mechanism, a scanning optical system such as a galvanometer mirror or a DMMD (Digital Micro Mirror Device) can be adopted as the scanning mechanism 11. The scanning performed by the scanning mechanism 11 is not limited to the example shown in FIG. 5. For example, a configuration that the scanning point is vertically reciprocated in the scanning area SA while shifting its position in the horizontal direction can be adopted.

The function of at least one of the laser light source control unit 81, the actuator control unit 82, the own vehicle data acquisition unit 83, the travelling environment determination unit 84, the other vehicle data acquisition unit 85, the other vehicle determination unit 86, the pedestrian data acquisition unit 87, the pedestrian determination unit 88, the intersection data acquisition unit 89, the intersection determination unit 90, the pedestrian risk determination unit 91 and the display content determination unit 92 in the lamp ECU 51 is realized by a software executed by the cooperation of the lamp ECU 51, the ROM 52 and the RAM 53. However, the function of at least one of the laser light source control unit 81, the actuator control unit 82, the own vehicle data acquisition unit 83, the travelling environment determination unit 84, the other vehicle data acquisition unit 85, the other vehicle determination unit 86, the pedestrian data acquisition unit 87, the pedestrian determination unit 88, the intersection data acquisition unit 89, the intersection determination unit 90, the pedestrian risk determination unit 91 and the display content determination unit 92 can be realized by a hardware such as a circuit element or a combination of a hardware and a software.

The contents of Japanese Patent Application No. 2014-181881 filed on Sep. 8, 2014 are incorporated as a part of the description of the present application.

The invention claimed is:

1. A road surface image-drawing system mounted on a vehicle comprising:
   an image-drawing device configured to perform image drawing so as to draw a first display to be visible to a driver of the vehicle at a first position and draw a second display to be visible to a person other than the driver at a second position different from the first position,
   a control device configured to correct a shape of the first display according to a positional relationship between the first position and the driver and correct a shape of the second display according to a positional relationship between the second position and the person other than the driver, and a pedestrian risk determination unit configured to acquire a pedestrian distance which is a distance from a pedestrian to the vehicle, and a pedestrian braking distance which is a braking distance from the pedestrian to the vehicle, wherein the control device is further configured to control the image drawing device according to a normal mode when it is determined that the pedestrian distance is equal to or greater than the pedestrian braking distance, and control the image drawing device according to an emergency mode when the pedestrian distance is less than the pedestrian braking distance.

2. The road surface image-drawing system according to claim 1,
wherein the first position and the second position are on a road.

3. The road surface image-drawing system according to claim 2,
wherein the first position is on the road located between an intersection and the vehicle, and
wherein the second position is on the intersection.

4. The road surface image-drawing system according to claim 3,
wherein the information included in the first display and the information included in the second display are related to each other.

5. The road surface image-drawing system according to claim 2,
wherein the information included in the first display and the information included in the second display are related to each other.

6. The road surface image-drawing system according to claim 1,
wherein the first position is on a windshield of the vehicle, and
wherein the second position is on a road.

7. The road surface image-drawing system according to claim 6,
wherein the information included in the first display and the information included in the second display are related to each other.

8. The road surface image-drawing system according to claim 1,
wherein the information included in the first display and the information included in the second display are related to each other.

9. The road surface image-drawing system according to claim 1,
wherein at least one of the first display and the second display is displayed at a higher frequency when the image drawing device is controlled according to the emergency mode than when the image drawing device is controlled according to the normal mode.

10. The road surface image-drawing system according to claim 1,
wherein at least one of the first display and the second display is displayed at an increased brightness when the image drawing device is controlled according to the emergency mode than when the image drawing device is controlled according to the normal mode.

11. The road surface image-drawing system according to claim 1,
wherein at least one of the first display and the second display is displayed with a different color sense when the image drawing device is controlled according to the emergency mode than when the image drawing device is controlled according to the normal mode.

12. The road surface image-drawing system according to claim 1,
wherein the control device is configured to correct the shape of the first display and to correct the shape of the second display according to a trapezoidal distortion correction.

13. A road surface image-drawing system mounted on a vehicle comprising:
an image-drawing device configured to draw a first display to be visible to a driver of the vehicle at a first position and draw a second display to be visible to a person other than the driver at a second position different from the first position, a vehicle data acquisition unit configured to receive data on a speed of the vehicle, a steering angle of the vehicle, an acceleration of the vehicle, a traveling direction of the vehicle, a braking of the vehicle, a navigation of the vehicle, and an illuminance of a surrounding environment of the vehicle, a traveling environment determination unit configured to determine whether image-drawing by the image-drawing device is possible based on the data received by the vehicle data acquisition unit, wherein the traveling environment determination unit is further configured to permit image-drawing by the image-drawing device when it is determined that image-drawing is possible, and prohibit image-drawing by the image-drawing device when it is determined that image-drawing is not possible, and a control device configured to correct a shape of the first display according to a positional relationship between the first position and the driver and correct a shape of the second display according to a positional relationship between the second position and the person other than the driver.

* * * * *